(12) United States Patent
Chang et al.

(10) Patent No.: US 8,924,303 B2
(45) Date of Patent: *Dec. 30, 2014

(54) METHOD AND SYSTEM FOR OBTAINING FEEDBACK FOR A PRODUCT

(75) Inventors: Amy Chang, Sunnyvale, CA (US); Jan Matthias Ruhl, Mountain View, CA (US); Todd Jackson, San Francisco, CA (US); Arturo Crespo, Sunnyvale, CA (US); Twum Djin, Mountain View, CA (US); Emily Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 902 days.

This patent is subject to a terminal disclaimer.

(21) Appl. No.: 12/975,309

(22) Filed: Dec. 21, 2010

(65) Prior Publication Data
US 2011/0093393 A1 Apr. 21, 2011

Related U.S. Application Data

(63) Continuation of application No. 11/355,767, filed on Feb. 15, 2006, now Pat. No. 7,860,803.

(51) Int. Cl.
*G06Q 30/00* (2012.01)
*H04L 9/28* (2006.01)
*G06Q 10/10* (2012.01)
*G06Q 20/36* (2012.01)
*G06Q 30/02* (2012.01)
*G06Q 50/22* (2012.01)

(52) U.S. Cl.
CPC .............. *G06Q 10/10* (2013.01); *G06Q 20/367* (2013.01); *G06Q 20/3674* (2013.01); *G06Q 30/02* (2013.01); *G06Q 30/0282* (2013.01); *G06Q 50/22* (2013.01)
USPC .............................. 705/50; 705/347; 235/380

(58) Field of Classification Search
CPC ............ G06Q 10/10; G06Q 20/20367; G06Q 20/3674; G06Q 30/02; G06Q 30/0283; G06Q 50/22
USPC .......... 705/2, 7, 10, 50, 65, 67; 709/218, 206; 726/2; 235/380
See application file for complete search history.

(56) References Cited

U.S. PATENT DOCUMENTS 5,893,075 A * 4/1999 Plainfield et al. .......... 705/14.67
5,950,172 A * 9/1999 Klingman .................... 705/27.1
(Continued)

FOREIGN PATENT DOCUMENTS

| WO | WO 0165338 A2 | * | 9/2001 | .............. G06F 17/60 |
| WO | WO 0229653 A1 | * | 4/2002 | .............. G06F 17/60 |
| WO | WO 2006065546 | * | 6/2006 | .............. G06Q 99/00 |

OTHER PUBLICATIONS www.lexiconn.com/ecommerce/shopsite/productreview.html;
"ShopSite Product Review add-on module from LexiConn"; Apr. 26, 2005; p. 1.*

(Continued)

*Primary Examiner* — Ella Colbert
(74) *Attorney, Agent, or Firm* — Morgan, Lewis & Bockius LLP

(57) ABSTRACT

The embodiments disclosed herein include new, more efficient ways to request, create, send, and receive product reviews from the Internet. One aspect of the invention is an email message for a customer. The email message includes a request to review a product obtained by the customer in a transaction; a rating input area and/or a text input area; an authentication token that includes a transaction identifier corresponding to the transaction; and an HTTP form submission command to send a response to the request from the customer to a remote computer. The response includes a rating entered in the rating input area and/or text entered in the text input area, and the authentication token.

23 Claims, 12 Drawing Sheets

(56) References Cited

U.S. PATENT DOCUMENTS

| | | | | |
|---|---|---|---|---|
| 5,956,693 | A | 9/1999 | Geerlings | 705/14 |
| 6,092,049 | A | 7/2000 | Chislenko et al. | 705/10 |
| 6,102,287 | A * | 8/2000 | Matyas, Jr. | 235/380 |
| 6,574,609 | B1 | 6/2003 | Downs et al. | 705/50 |
| 6,631,184 | B1 * | 10/2003 | Weiner | 379/92.01 |
| 6,708,205 | B2 * | 3/2004 | Sheldon et al. | 709/206 |
| 6,963,848 | B1 * | 11/2005 | Brinkerhoff | 705/7.32 |
| 7,219,301 | B2 | 5/2007 | Barrie et al. | 715/751 |
| 7,254,384 | B2 * | 8/2007 | Gailey et al. | 455/412.1 |
| 7,277,926 | B1 | 10/2007 | Lee | 709/218 |
| 7,349,871 | B2 | 3/2008 | Labrou et al. | 705/26 |
| 7,356,834 | B2 | 4/2008 | Smith et al. | 726/2 |
| 7,613,717 | B1 * | 11/2009 | Reed et al. | 1/1 |
| 7,860,803 | B1 | 12/2010 | Chang et al. | 705/65 |
| 7,877,265 | B2 * | 1/2011 | Pasquale et al. | 705/1.1 |
| 7,962,461 | B2 * | 6/2011 | Ruhl et al. | 707/706 |
| 8,101,480 | B1 * | 1/2012 | Kim et al. | 438/231 |
| 8,438,469 | B1 * | 5/2013 | Scott et al. | 715/230 |
| 2001/0032115 | A1 | 10/2001 | Goldstein | 705/10 |
| 2002/0016744 | A1 | 2/2002 | Mitsuoka et al. | 705/26 |
| 2002/0026390 | A1 * | 2/2002 | Ulenas et al. | 705/27 |
| 2002/0095454 | A1 | 7/2002 | Reed et al. | 709/201 |
| 2002/0143607 | A1 * | 10/2002 | Connelly | 705/10 |
| 2002/0194081 | A1 | 12/2002 | Perkowski | 705/26 |
| 2004/0064351 | A1 | 4/2004 | Mikurak | 705/7 |
| 2004/0073625 | A1 * | 4/2004 | Chatani | 709/217 |
| 2005/0060283 | A1 | 3/2005 | Petras et al. | 707/1 |

OTHER PUBLICATIONS

Yahoo! Small Business Merchant Solutions, "Customer Ratings: How it Works," http://help.yahoo.com/help/us/store/manager/sitesettings/sitesettings-12.html, 2006, 6 pages.

Yahoo! Shopping, "How do I submit a merchant rating and review?" http://help.yahoo.com/help/us/shop/shop-74.html, 2003, 1 page.

Korpela, J., "Methods Get and Post in HTML forms —What's the Difference?" http://www.cs.tut.fi/1jkorpela/fonns/methods.html, Sep. 28, 2003, 5 pages.

"Groovyweb Free Downloads and Tutorials," http://64.233.179.104/search?q=cache:JffUPr1uIIkJ:www.groovyweb.uklinux.net/%3Fpage_name%3Dhttp,%2520post,%2520get%2520and%2520head%2520commands+%22http+post%22+command+forma&hl=en &gl=us&ct=clnk&cd=19, Jan. 29, 2006, 14 pages.

http://msnbc.msn.com/id/11076130/page/2/, for rating of story, 2006, 4 pages.

* cited by examiner

Message 322

From: Google <purchases-noreply@google.com>
Date: Jan 23, 2006 8:56 PM
Subject: How was your transaction with Business Name on Jan. 23?
To: acustomer@abc.com Customer Name:

Thank you for your purchase from Business Name on Jan. 23.

You bought: Product(s).

702-1 — Congratulations on being the first buyer to have the opportunity to rate Business Name! As an early buyer, your feedback is especially helpful to the seller and to other potential buyers. Please take a moment to rate Business Name now.

(If you cannot see the rating selector below or the form does not work for you, please leave your feedback at http://spira.corp.google.com:4242/purchases/rate?t=8185364339&e=l )

704 —
Rating: 
- ○ ★★★★★ Excellent, I'd definitely buy from this seller again.
- ○ ★★★★ Above average
- ○ ★★★ Average
- ○ ★★ Below average
- ○ ★ Poor, I'd discourage others from this seller.

706 —
Comments
How did the seller handle your order, ship your items, and communicate with you?

[                                        ]

808 — [Submit review] -------- HTTP post command 708

Authentication token 710

Thank you in advance for sharing your rating!

Figure 8A

Message 322

From: Google <purchases-noreply@google.com>
Date: Jan 23, 2006 8:56 PM
Subject: How was your transaction with Business Name on Jan. 23?
To: acustomer@abc.com Customer Name:

Thank you for your purchase from Business Name on Jan. 23.

You bought: Product(s).

702-2 — Business Name has received a rating from 1 buyer. As an early buyer, your feedback is especially helpful to the seller and to other potential buyers. Please take a moment to rate Business Name now.

(If you cannot see the rating selector below or the form does not work for you, please leave your feedback at http://spira.corp.google.com:4242/purchases/rate?t=8185364339&e=1 )

704 —
Rating: ○ ★★★★★ Excellent, I'd definitely buy from this seller again.
○ ★★★★ Above average
○ ★★★ Average
○ ★★ Below average
○ ★ Poor, I'd discourage others from this seller.

706 —
Comments
How did the seller handle your order, ship your items, and communicate with you?

[                                    ]

808 — Submit review ---- HTTP post command 708

Authentication token 710

Thank you in advance for sharing your rating!

Figure 8B

Message 322

From: Google <purchases-noreply@google.com>
Date: Jan 23, 2006 8:56 PM
Subject: How was your transaction with Business Name on Jan. 23?
To: acustomer@abc.com Customer Name:

Thank you for your purchase from Business Name on Jan. 23.

You bought: Product(s).

702-3 — Business Name is currently rated by 4 buyers. As an early buyer, your feedback is especially helpful to the seller and to other potential buyers. Please take a moment to rate this transaction.

(If you cannot see the rating selector below or the form does not work for you, please leave your feedback at http://spira.corp.google.com:4242/purchases/rate?t=8185364339&e=l )

704 — Rating:
○ ★★★★★  Excellent, I'd definitely buy from this seller again.
○ ★★★★   Above average
○ ★★★    Average
○ ★★     Below average
○ ★      Poor, I'd discourage others from this seller.

706 — Comments
How did the seller handle your order, ship your items, and communicate with you?

[                                        ]

808 — [ Submit review ] - - - - - [ HTTP post command 708 ]

[ Authentication token 710 ]

Thank you in advance for sharing your rating!

Figure 8C

Message 322

From: Google <purchases-noreply@google.com>
Date: Jan 23, 2006 8:56 PM
Subject: How was your transaction with Business Name on Jan. 23?
To: acustomer@abc.com Customer Name:

Thank you for your purchase from Business Name on Jan. 23.

You bought: Product(s).

702-4 — Business Name currently has an average rating of 3.4 out of 5 stars, as rated by 12 buyers. As an early buyer, your feedback is especially helpful to the seller and to other potential buyers. Please take a moment to rate this transaction.

(If you cannot see the rating selector below or the form does not work for you, please leave your feedback at http://spira.corp.google.com:4242/purchases/rate?t=8185364339&e=I )

704 —
Rating: ○ ★★★★★ Excellent, I'd definitely buy from this seller again.
○ ★★★★ Above average
○ ★★★ Average
○ ★★ Below average
○ ★ Poor, I'd discourage others from this seller.

706 —
Comments
How did the seller handle your order, ship your items, and communicate with you?

[                                        ]

808 — Submit review  - - - - - HTTP post command 708

Authentication token 710

Thank you in advance for sharing your rating!

Figure 8D

Message 322

From: Google <purchases-noreply@google.com>
Date: Jan 23, 2006 8:56 PM
Subject: How was your transaction with Business Name on Jan. 23?
To: acustomer@abc.com Customer Name:

Thank you for your purchase from Business Name on Jan. 23.

You bought: Product(s).

702-5 — Business Name currently has an average rating of 3.4 out of 5 stars, as rated by 22 buyers. Your feedback helps other buyers make purchase decisions, and helps the seller improve the customer experience. We appreciate you taking a moment to rate this transaction.

(If you cannot see the rating selector below or the form does not work for you, please leave your feedback at http://spira.corp.google.com:4242/purchases/rate?t=8185364339&e=I )

704 — Rating:
○ ★★★★★ Excellent, I'd definitely buy from this seller again.
○ ★★★★ Above average
○ ★★★ Average
○ ★★ Below average
○ ★ Poor, I'd discourage others from this seller.

706 — Comments
How did the seller handle your order, ship your items, and communicate with you?

[                                    ]

808 — [Submit review] ----- HTTP post command 708

Authentication token 710

Thank you in advance for sharing your rating!

Figure 8E

METHOD AND SYSTEM FOR OBTAINING FEEDBACK FOR A PRODUCT

RELATED APPLICATION

This application is a continuation application of U.S. patent application Ser. No. 11/355,767, filed Feb. 15, 2006 now U.S. Pat. No. 7,860,803, entitled "Method and System for Obtaining Feedback for a Product," which application is incorporated by reference herein in its entirety.

This application is related to U.S. patent application Ser. No. 11/335,766, filed Feb. 15, 2006, entitled "Method and System for Receiving Feedback for a Product," which application is incorporated by reference herein in its entirety.

TECHNICAL FIELD

The disclosed embodiments relate generally to customer reviews. More particularly, the disclosed embodiments relate to methods and systems for receiving customer feedback for a product and/or service.

BACKGROUND

The Internet has become a pervasive communications tool for business. Many businesses try to use the Internet to obtain customer feedback (e.g., reviews and/or ratings) on their products and services. Customers often fail to provide such feedback, however, in part because the existing feedback mechanisms are too cumbersome. There have been previous efforts to streamline the process to encourage more customer feedback. For example, U.S. Pat. No. 6,693,848 describes methods and systems for obtaining consumer reviews. Nevertheless, the existing processes take too many mouse clicks and too much time for many customers.

Thus, it would be highly desirable to create simpler, more streamlined mechanisms so that more customers will use the Internet to provide feedback on the products and services they obtain from businesses.

SUMMARY

The embodiments disclosed herein provide new, more efficient ways to request, create, send, and receive customer product reviews using the Internet.

As used in the specification and claims, the word "product" refers to both products and services. Moreover, "product" encompasses virtually any product, service or combination thereof that can be bought, leased, rented, or similarly obtained. Exemplary products include, without limitation, consumer products, business products, movies, books, restaurants, hotels, travel packages, and online transaction services (e.g., online purchase transactions).

As used in the specification and claims, the phrase "HTTP form submission command" refers to a command to perform an HTTP post, an HTTP get, an HTTPS post, or an HTTPS get in order to submit one or more types of customer feedback data (e.g., reviews and/or ratings). As used in the specification and claims, the phrase "HTTP form submission" refers to the information sent in response to activation of the HTTP form submission command (e.g., a rating for a product and/or text of a review of the product, and an authentication token). HTTP refers to Hyper Text Transfer Protocol, and HTTPS refers to Hyper Text Transfer Protocol Secure (a variant of HTTP for handling secure transactions using SSL, the Secure Sockets Layer protocol).

One aspect of the invention involves a method in which a server sends an email message to a customer at a predetermined time. The email message contains a request to review a product obtained by the customer in a transaction, a rating input area and/or a text input area, an authentication token, and an HTTP form submission command to send a response to the request from the customer to a remote computer. The server receives the response. The response contains a rating that was entered in the rating input area and/or text that was entered in the text input area, and the authentication token. The server authenticates the response using the authentication token. The server stores at least part of the response if no other responses corresponding to the transaction have been received.

Another aspect of the invention is an email message for a customer. The email message includes a request to review a product obtained by the customer in a transaction; a rating input area and/or a text input area; an authentication token that includes a transaction identifier corresponding to the transaction; and an HTTP form submission command to send a response to the request from the customer to a remote computer. The response includes a rating that was entered in the rating input area and/or text that was entered in the text input area, and the authentication token.

Another aspect of the invention involves a method in which a client computer associated with a customer receives an electronic message. The electronic message contains a request to review a product obtained by the customer in a transaction, a rating input area and/or a text input area, an authentication token, and an HTTP form submission command to send a response to the request from the customer to a remote computer. The client computer sends, in response to activation of the HTTP form submission command, the response to the request to the remote computer. The response to the request contains a rating that was entered in the rating input area and/or text that was entered in the text input area, and the authentication token.

Another aspect of the invention is a system that includes at least one server. The at least one server is configured to send an email message to a customer at a predetermined time. The email message contains a request to review a product obtained by the customer in a transaction, a rating input area and/or a text input area, an authentication token, and an HTTP form submission command to send a response to the request from the customer to a remote computer. The at least one server is also configured to receive the response. The response contains a rating that was entered in the rating input area and/or text that was entered in the text input area, and the authentication token. The at least one server is also configured to authenticate the response using the authentication token. The at least one server is also configured to store at least part of the response if no other responses corresponding to the transaction have been received.

Another aspect of the invention is a client computer associated with a customer. The client computer is configured to receive an electronic message. The electronic message contains a request to review a product obtained by the customer in a transaction, a rating input area and/or a text input area, an authentication token, and an HTTP form submission command to send a response to the request from the customer to a remote computer. The client computer is also configured to send, in response to activation of the HTTP form submission command, the response to the request to the remote computer. The response to the request contains a rating that was entered in the rating input area and/or text that was entered in the text input area, and the authentication token.

Another aspect of the invention is a machine readable medium having stored thereon data representing sequences of instructions, which when executed by a server, cause the server to send an email message to a customer at a predetermined time. The email message contains a request to review a product obtained by the customer in a transaction, a rating input area and/or a text input area, an authentication token, and an HTTP form submission command to send a response to the request from the customer to a remote computer. The instructions also cause the server to receive the response. The response contains a rating that was entered in the rating input area and/or text that was entered in the text input area, and the authentication token. The instructions also cause the server to authenticate the response using the authentication token. The instructions also cause the server to store at least part of the response if no other responses corresponding to the transaction have been received.

Another aspect of the invention is a machine readable medium having stored thereon data representing sequences of instructions, which when executed by a client computer associated with a customer, cause the client computer to receive an electronic message. The electronic message contains a request to review a product obtained by the customer in a transaction, a rating input area and/or a text input area, an authentication token, and an HTTP form submission command to send a response to the request from the customer to a remote computer. The instructions also cause the client computer to send, in response to activation of the HTTP form submission command, the response to the request to the remote computer. The response to the request contains a rating that was entered in the rating input area and/or text that was entered in the text input area, and the authentication token.

Another aspect of the invention is a system that includes means for sending an email message to a customer at a predetermined time. The email message contains a request to review a product obtained by the customer in a transaction, a rating input area and/or a text input area, an authentication token, and an HTTP form submission command to send a response to the request from the customer to a remote computer. The system also includes means for receiving the response. The response contains a rating that was entered in the rating input area and/or text that was entered in the text input area, and the authentication token. The system also includes means for authenticating the response using the authentication token; and means for storing at least part of the response if no other responses corresponding to the transaction have been received.

Another aspect of the invention is a client computer associated with a customer that includes means for receiving an email message. The email message contains a request to review a product obtained by the customer in a transaction, a rating input area and/or a text input area, an authentication token, and an HTTP form submission command to send a response to the request from the customer to a remote computer. The client computer also includes means for sending, in response to activation of the HTTP form submission command, the response to the request to the remote computer. The response to the request contains a rating that was entered in the rating input area and/or text that was entered in the text input area, and the authentication token.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIGS. 8A-8E are exemplary email messages requesting reviews in accordance with one embodiment of the present invention.

DESCRIPTION OF EMBODIMENTS

Improved methods and systems are described that show how to request, create, send, and receive customer feedback for a product. As noted above, the term "product," as used in the specification and claims, refers to both products and services. Moreover, "product" encompasses virtually any product, service or combination thereof that can be bought, leased, rented, or similarly obtained. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
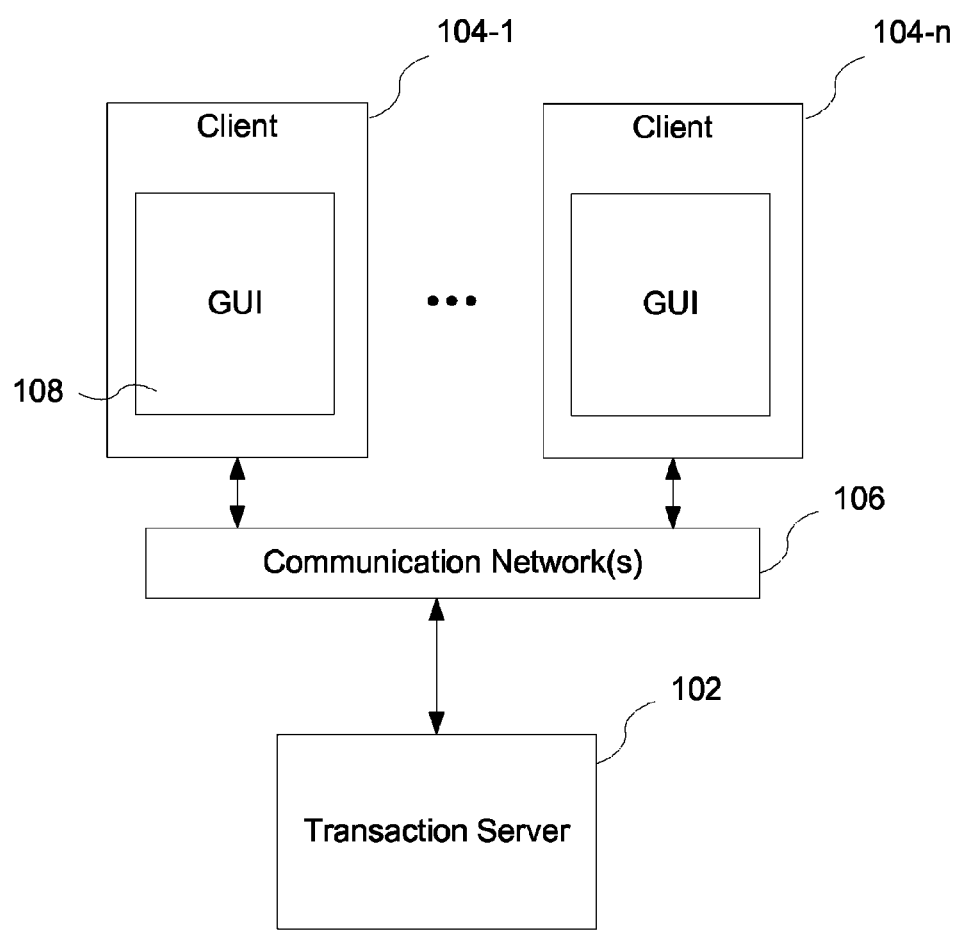
FIG. 1 is a block diagram illustrating an exemplary distributed computer system in accordance with one embodiment of the present invention.

FIG. 1 is a block diagram illustrating an exemplary distributed computer system in accordance with one embodiment of the present invention. This system includes transaction server 102, client computers 104-1 to 104-n, herein collectively called computers 104, and communication network(s) 106 for interconnecting these components. Transaction server 102 sends electronic messages (e.g., HTML email messages) to customers requesting feedback on products obtained by the customer and receives the feedback from the customer (e.g., via the customer inputting a response into client 104 and sending it back to the transaction server via communications network 106). Client computers 104 can be any of a number of computing devices (e.g., an Internet kiosk, personal digital assistant, cell phone, gaming device, desktop computer, or laptop computer) used to enable the activities described below. Client 104 includes graphical user interface (GUI) 108, which displays the electronic messages to the customers and the customers' responses.

Figure 2:
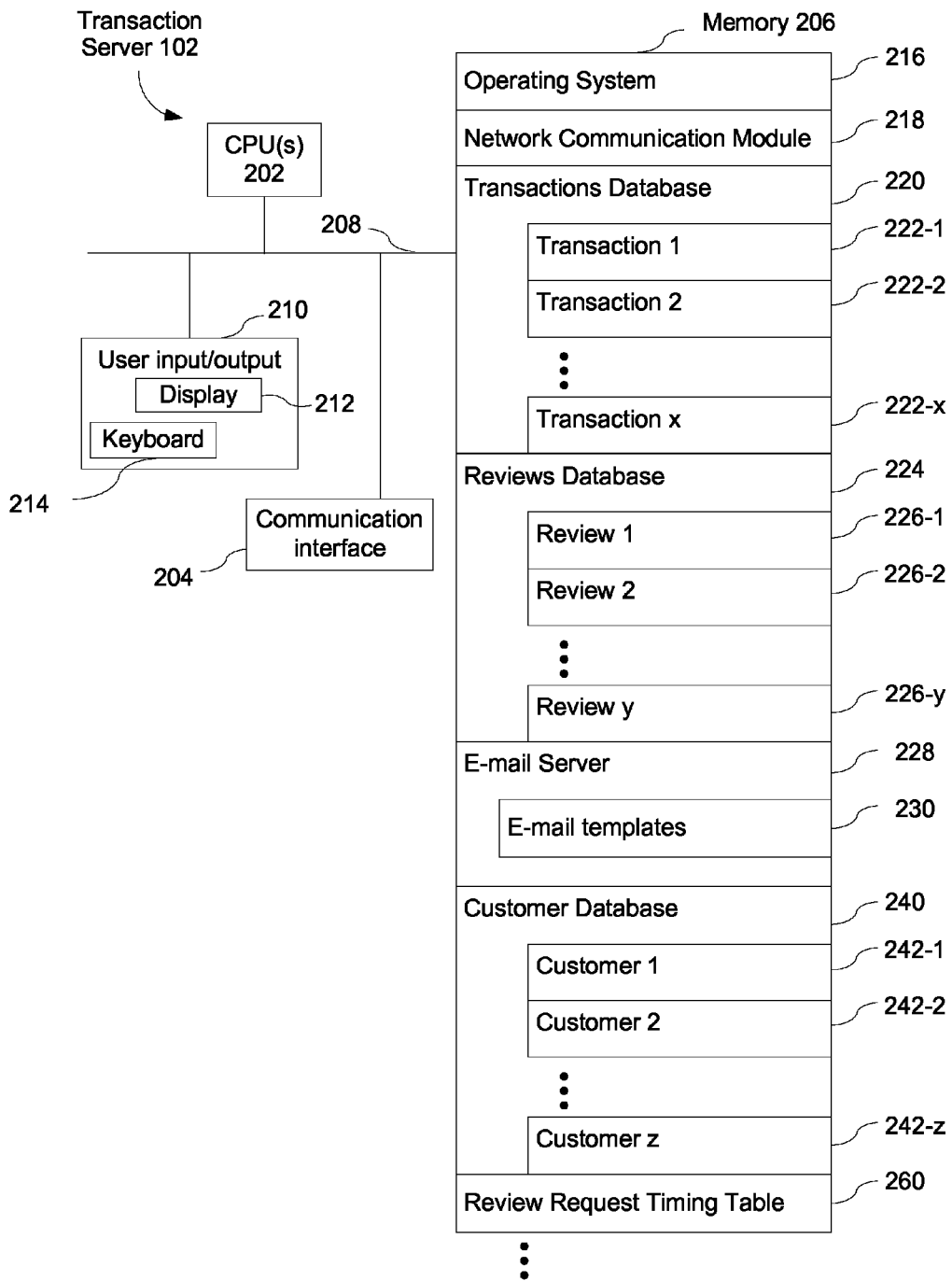
FIG. 2 is a block diagram illustrating a transaction server in accordance with one embodiment of the present invention.

FIG. 2 is a block diagram illustrating transaction server 102 in accordance with one embodiment of the present invention. Transaction server 102 typically includes one or more processing units (CPU's) 202, one or more network or other communications interfaces 204, memory 206, and one or more communication buses 208 for interconnecting these components. Server 102 optionally may include a user interface 210 comprising a display device 212 and a keyboard 214. Memory 206 may include high speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

- operating system 216 that includes procedures for handling various basic system services and for performing hardware dependent tasks;
- network communication module (or instructions) 218 that is used for connecting server 102 to other computers (e.g., clients 104) via the one or more communications network interfaces 204 (wired or wireless) and one or more communications networks 106 (FIG. 1), such as the Internet, other wide area networks, local area networks, metropolitan area networks, and so on;
- transaction database 220 that stores transaction records 222-1 and 222-2 to 222-*x*, herein collectively called transaction records 222, of customer transactions (e.g., purchases);
- reviews database 224 that stores feedback (e.g., reviews and/or ratings) records 226-1 and 226-2 to 226-*y*, herein collectively called feedback records 226, received from customers about their transactions;
- email server 228 that sends requests for feedback to customers and receives the customers' responses;
- customer database 240 that stores customer records 242-1 and 242-2 to 242-*z*, herein collectively called customer records 242; and
- review requesting timing table 260, used to determine when to send review requests to customers.

Email server 228 may include email templates 230 that tailor the message sent to customers based on the number of customers that have previously submitted feedback on the product (and/or service provider) that the present customer is being asked to critique. In some embodiments, the email templates 230 tailor the message sent to customers for a particular product or service provider (e.g., different providers have templates 230 customized for their particular businesses).

Figure 3:
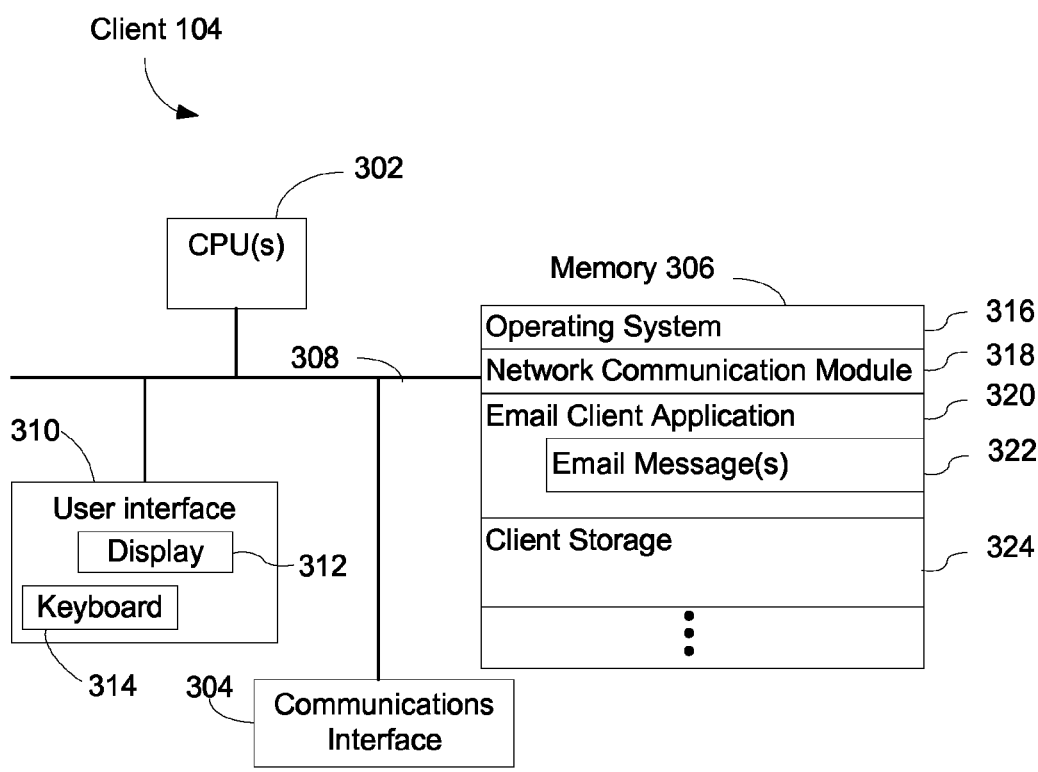
FIG. 3 is a block diagram illustrating a client in accordance with one embodiment of the present invention.

FIG. 3 is a block diagram illustrating client 104 in accordance with one embodiment of the present invention. Client 104 typically includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components. The client system 104 includes a user interface 310, for instance a display 312 with GUI 108 and a keyboard 314. Memory 306 may include high speed random access memory and may also include non-volatile memory, such as one or more magnetic or optical storage disks. Memory 306 may include mass storage that is remotely located from CPUs 302. Memory 306 may store the following elements, or a subset or superset of such elements:

- an operating system 316 that includes procedures for handling various basic system services and for performing hardware dependent tasks;
- a network communication module (or instructions) 318 that is used for connecting the client system 104 to other computers (e.g., server 102) via the one or more communications interfaces 304 (wired or wireless) and one or more communication networks, such as the Internet, other wide area networks, local area networks, metropolitan area networks, and so on;
- an email application 320 that receives email messages 322 (FIGS. 3, 7 and 8) from transaction server 102 requesting customer feedback and sends responses (e.g., HTTP form submission 716, FIG. 7) to the transaction server 102; and
- client storage 324 that may be used to store some of the email messages 322.

Each of the above identified modules and applications in FIGS. 2-3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIGS. 2-3 show transaction server 102 and client 104 as a number of discrete items, FIGS. 2-3 are intended more as a functional description of the various features which may be present in transaction server 102 and client 104 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. For example, in some embodiments, the reviews 226 in reviews database 224 are merged into the transaction records 222 in transaction database 220 (e.g., if information concerning each respective transaction is stored in a row in a database table (or more generally in a database), the contents of the reviews 226 can be stored in one or more columns in the database table). In some embodiments, email server 228 is separated into one or more servers that send email messages to customers and one or more servers that receive HTTP form submissions from clients 104. Moreover, in some embodiments the servers that send email messages and the servers that receive HTTP form submissions are at the same geographic location while in other embodiments they are at different geographic locations. The actual number of servers in transaction server 102 and how features are allocated among them will vary from one implementation to another, and may depend in part on the amount of data traffic that the system must handle during peak usage periods as well as during average usage periods.

Figure 4:
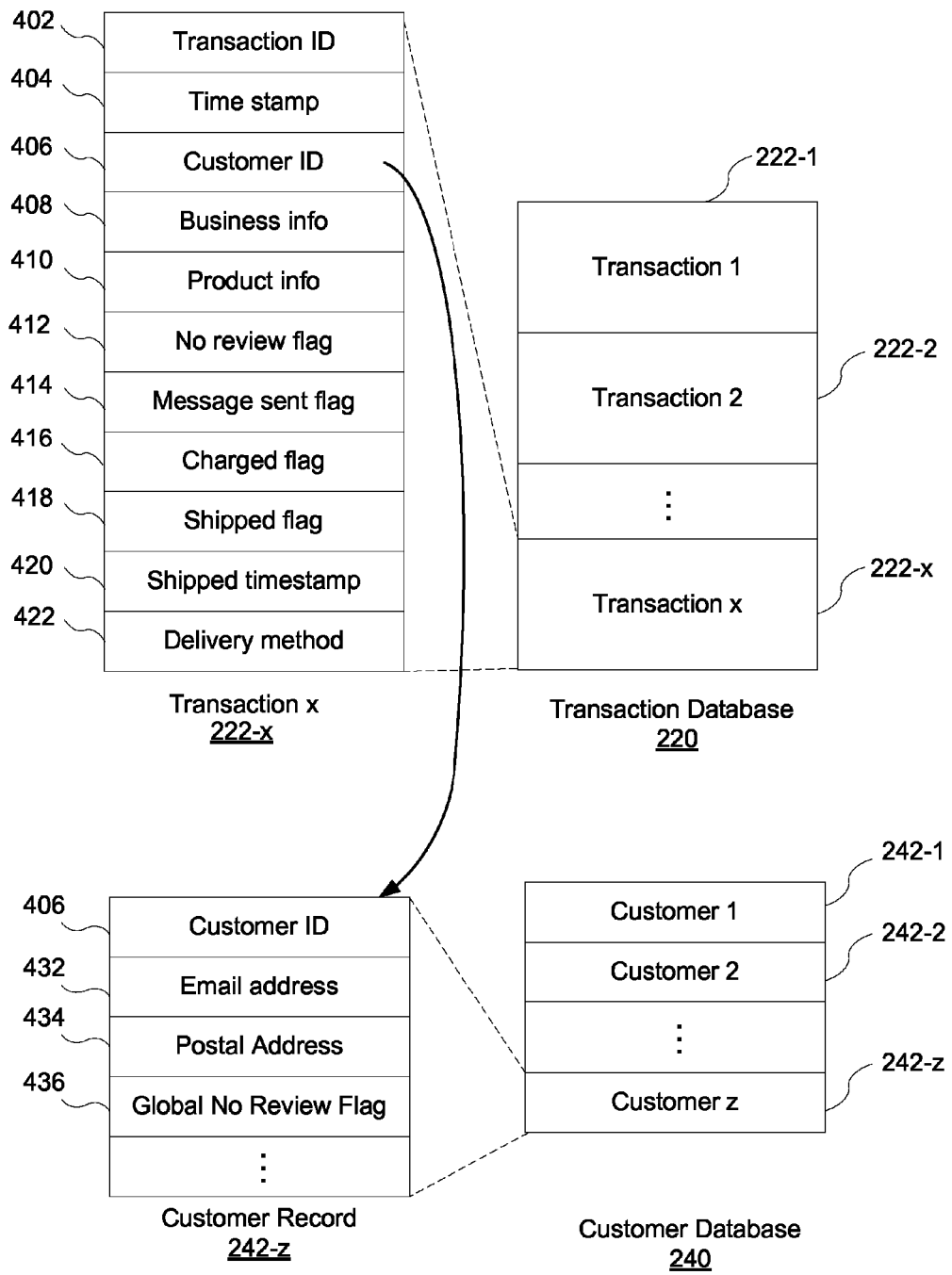
FIG. 4 is a block diagram illustrating an exemplary transaction database and an exemplary transaction record in accordance with one embodiment of the present invention.

FIG. 4 is a block diagram illustrating an exemplary transaction database 220 and an exemplary transaction record 222 in accordance with one embodiment of the present invention. Transaction database 220 stores transaction records 222, for example transaction 1 (222-1) and transaction 2 (222-2) through transaction x (222-*x*), where x may represent the number of transactions.

A transaction record (e.g., transaction x 222-x) may include the following data, or a subset or superset thereof:

Transaction ID 402 (e.g., an n-bit binary number assigned by the transaction server 102) that uniquely identifies a particular transaction;

Timestamp 404 is a value (e.g., an n-bit binary number) that represents the date and/or time at which the particular transaction record 220 was created or at which the particular transaction occurred;

Customer ID (also called the customer identifier) 406 that associates the information in transaction record 220 with a particular customer. In some embodiments, many but not necessarily all customer IDs are associated with particular computer users (e.g., when the user logs in with a username and password) and with their respective email addresses. For instance, some transaction IDs and customer IDs may be associated with online orders from online customers, while other transaction IDs and customer IDs are associated with orders received by telephone, fax or mail;

Business information 408 that includes data about the seller or other business involved in the transaction. In some embodiments, business information 408 includes a business identifier that associates the information in transaction record 220 to a particular business;

Product information 410 that includes information about the products and/or services involved in the transaction;

No review flag 412 that indicates that the customer does not want to receive a request to review the product and/or transaction;

Message sent flag 414 that indicates that an electronic message requesting feedback about the product has already been sent to the customer.

Charged flag 416 that indicates that the customer has been charged for the product;

Shipped flag 418 that indicates that the product has been shipped;

Shipped timestamp 420 that indicates the date and time that the product was shipped; and Delivery method 422 that specifies how the product will be delivered (e.g., regular mail, express mail, FedEx, download, or other similar method).

In some embodiments, the customer can opt in or opt out of receiving requests to review products obtained by the customer. The opt in or opt out may be on a global basis and/or per transaction basis. For opt in embodiments, the "no review" flag 412 may be replaced by a "review okay" flag that indicates that the customer wants to receive a request to review the product and/or transaction.

Also shown in FIG. 4 is a customer database 240 with a plurality of customer records 242, including customer record 242-1 and customer records 242-2 to 242-z. An exemplary customer record 242-z includes the customer ID 406 of a respective customer; an email address 432 associated with the customer (if no email is known for the customer, this field would be left blank); a postal or other physical address 434, such as a delivery address for delivering products and services or a billing address; an optional global "no review" flag 436, which if set indicates that the customer has asked not to receive requests for product reviews (i.e., a global opt out). A customer record 242-z may optionally include many other fields for storing additional information such as additional contact information, billing information, account status information, and so on. As shown in FIG. 4, the customer ID 406 in a transaction record 222 can be used to locate a corresponding customer record 242 in the customer database 240, from which the customer's email address and other customer-specific information (e.g., the value of the customer's global "no review" flag 434) can be obtained.

Figure 5:
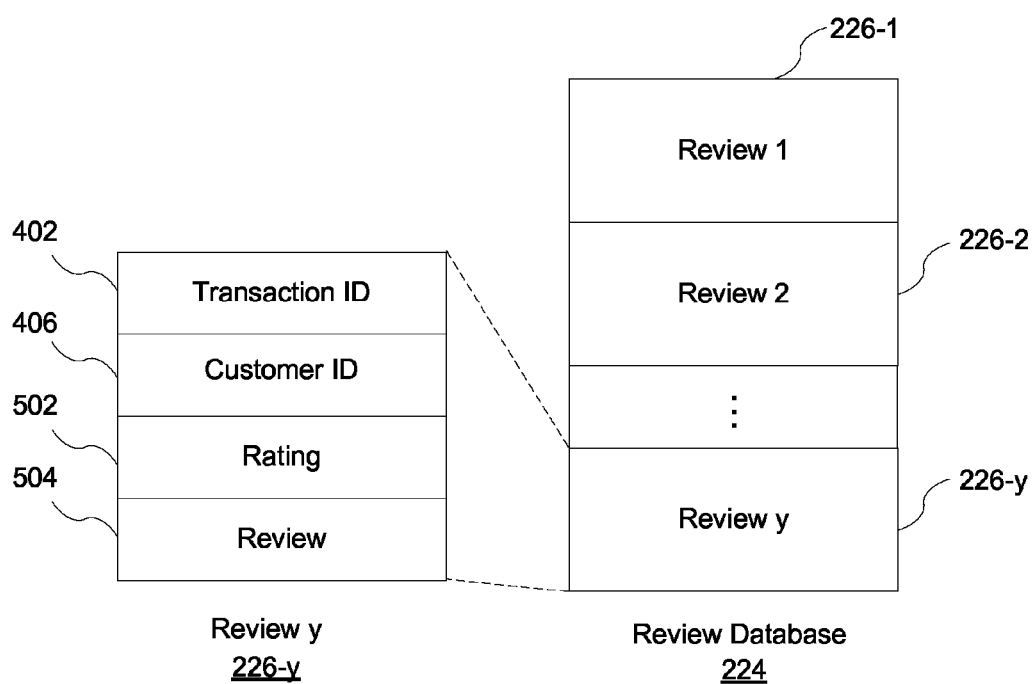
FIG. 5 is a block diagram illustrating an exemplary review database and an exemplary review record in accordance with one embodiment of the present invention.

FIG. 5 is a block diagram illustrating an exemplary review database 224 and an exemplary review record 226-y in accordance with one embodiment of the present invention. Review database 224 stores review records 226, for example review 1 (226-1) and review 2 (226-2) through review y (226-y), where y may represent the number of reviews.

A review record 226 (e.g., review 226-y) may include the following data, or a subset or superset thereof:

Transaction ID 402, as described above;
Customer ID 406, as described above;
Rating 502 that provides an indication of the customer's overall satisfaction with a product or transaction (e.g., 1-5 stars or A-F grades); and
Review 504 that provides the text of a customer's comments about a transaction and/or the products involved in the transaction.

Figure 6:
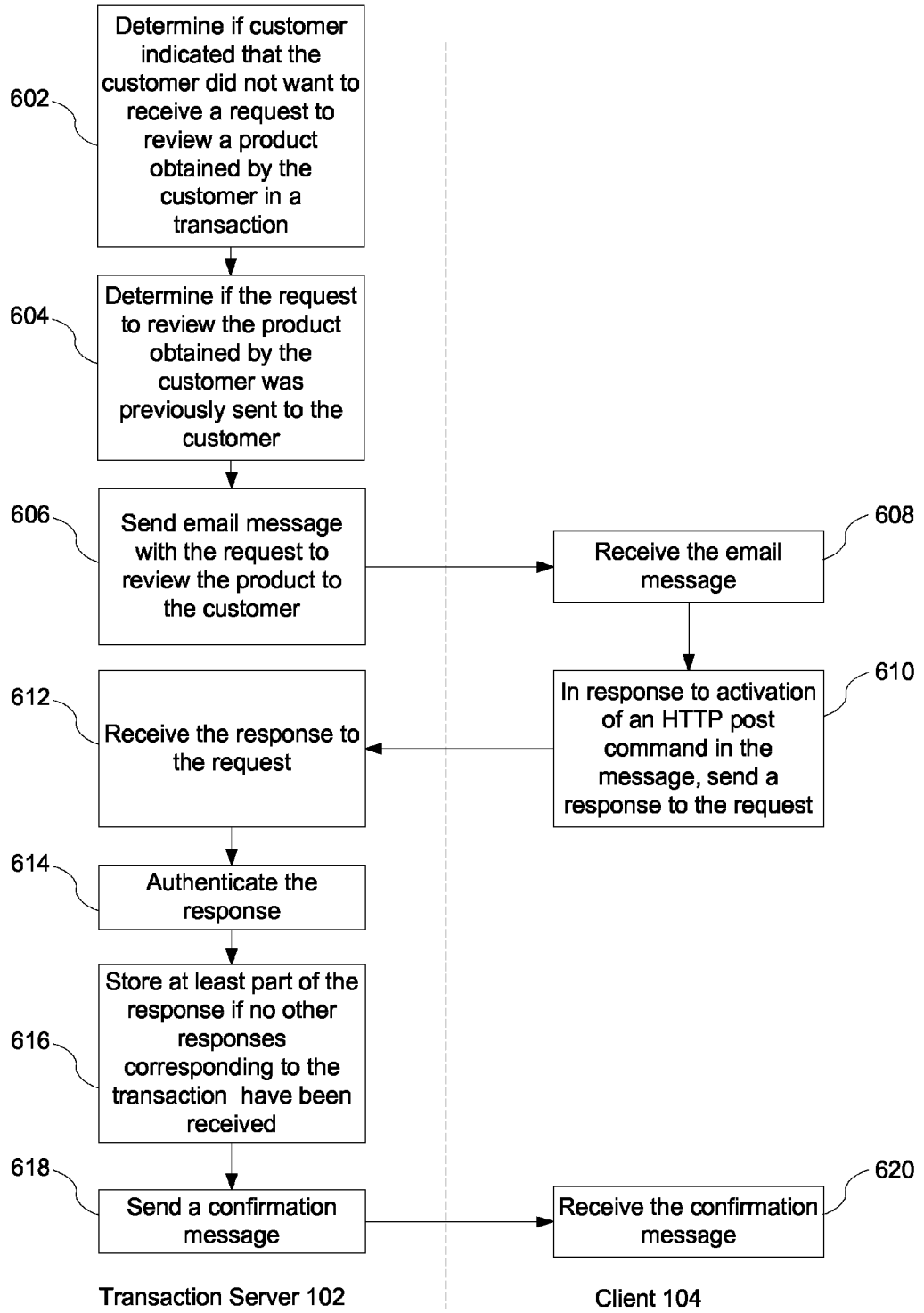
FIG. 6 is a flowchart representing methods for requesting, creating, sending, and receiving reviews for a product in accordance with one embodiment of the present invention.

FIG. 6 is a flowchart representing methods for requesting, creating, sending, and receiving reviews for a product in accordance with one embodiment of the present invention. FIG. 6 shows processes performed by transaction server 102 and client 104. It will be appreciated by those of ordinary skill in the art that one or more of the acts described may be performed by hardware, software, or a combination thereof, as may be embodied in one or more computing systems.

In some embodiments, server 102 determines (602) if a customer indicated that the customer did not want to receive a request to review a product obtained by the customer (e.g., by purchase, lease, rental, or other similar transaction). In some embodiments, the customer indicates that he or she does not want to receive a request to review a product by checking a box during the corresponding transaction, which sets no review flag 412 in the corresponding transaction record 222. In some embodiments, server 102 checks whether flag 412 has been set. If the flag 412 has been set, then no request for a review is sent to the customer.

In some embodiments, server 102 determines (604) if the request to review the product obtained by the customer was previously sent to the customer. In some embodiments, when a request is sent, the message sent flag 414 in the corresponding transaction record 222 is set. In some embodiments, server 102 checks whether flag 414 has been set. If the flag 414 has been set, then no further requests for a review are sent to the customer.

Not sending requests for reviews to customers that do not want to receive such requests and not sending such requests more than once avoids cluttering the customer's email application 320 with unwanted messages, which may increase the likelihood that the customer will respond to the requests for reviews that are sent.

In some embodiments, additional checks may be made before sending the request. For example, the message may not be sent until a charged flag 416 and/or a shipped flag 418 have been set.

Email server 228 sends (606) an email message to the customer at a predetermined time. In some embodiments, the email message is an HTML email. In some embodiments, the message is only sent if (A) the customer did not indicate that the customer did not want to receive a request to review the product and (B) a request to review the product obtained by the customer was not previously sent to the customer.

In some embodiments, the message is sent at a predetermined time that is based at least in part on the method of sending the product to the customer. In some embodiments, server 102 determines a review request time in accordance with a respective product delivery method 422 for the product obtained by the customer, wherein the respective product delivery method 422 is one of a plurality of predefined product delivery methods, each of which has an associated method of determining the review request time in accordance with a product shipment time 420 or delivery time. In some embodiments, server 102 determines the review request time by performing a lookup in transaction database 220 to determine the product delivery method 422 of the product obtained by the customer and performing a predefined set of operations so as to determine a time value, based on the determined product delivery method 422, to be used in computing the review request time. In some embodiments, server 102 determines the review request time by performing a first lookup in transaction database 220 to determine the product delivery method 422 of the product obtained by the customer and a second lookup to determine a time value (e.g., shipped timestamp 420) to be used in computing the review request time.

For example, if there are M delivery methods used to deliver products, each respective delivery method may be assigned a respective time value that is used to determine when to send a review request message. For instance, each respective time value may indicate the length of time after the product has been shipped that the review request message should be sent. In this way, fast delivery methods (e.g., overnight delivery) may be associated with shorter time values than slower delivery methods.

Furthermore, some product delivery methods may enable the system to determine when the customer (or the customer's agent) has actually received a product, for instance by polling or otherwise accessing a delivery tracking information service. For those product delivery methods, the respective time value may indicate the amount of time after actual delivery until the review request message is sent. In other words, for those product delivery methods, server 102 may determine the review request time in accordance with the delivery receipt time.

In some embodiments, a review request timing table (e.g., table 260, FIG. 2) may be used to store the time values for different product delivery methods. The table may also include one or more fields that indicate whether the respective time value for a respective delivery method is an offset from the time of shipment or from the time of actual receipt by the customer.

Figure 7A:
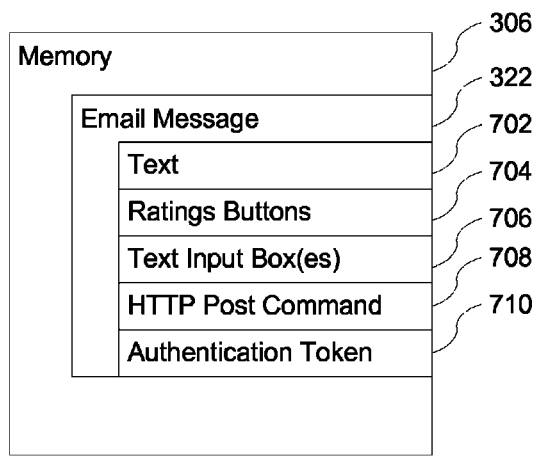
FIG. 7A is a block diagram of an email message, as stored for example in client memory, in accordance with one embodiment of the present invention.

FIG. 7A is a block diagram of an email message 322, as stored for example in client memory 306, in accordance with one embodiment of the present invention. FIGS. 8A-8E show exemplary email messages 322 requesting feedback according to one embodiment of the present invention. The exemplary emails in FIG. 8 concern requests for feedback about the service provided by a business in an online transaction. Analogous emails may request feedback about the products provided by a business.

A feedback request email 322 may include the following items, or a subset or superset thereof:
one or more portions of text 702 with a request to review the product obtained by the customer and/or the transaction;
a rating input area 704 (e.g., with ratings buttons or similar icons) for entering the customer's rating of the product and/or transaction;
a text input area 706 (e.g., text input box(es)) for entering the text, if any, of the customer's review;
an HTTP form submission command 708, which, as noted above, is a command (embedded in the email message) to perform an HTTP post, an HTTP get, an HTTPS post, or an HTTPS get, to send a response to the request from the customer to a remote computer (e.g., transaction server 102) when the customer submits his or her review, for example by activating a review submission icon 808; and
an authentication token 710 that may include
transaction ID 402, as described above,
customer ID 406, as described above,
encrypted transaction ID 712 (i.e., an encrypted form of transaction ID 402), and
encrypted customer ID 714 (i.e., an encrypted form of customer ID 406).

In FIG. 8, the HTTP form submission command 708 and the authentication token 710 are drawn in boxes with dotted lines to indicate that these items are not normally visible when the customer views email 322.

In some embodiments, as shown in 702-1-702-5, the text of the request 702 to review the product depends on the number of reviews previously received for the product from other customers. In some embodiments, the text 702 is tailored to persuade the customer to provide a review. For example, for early customers, the text 702 can appeal to the customer's desire to be amongst the first people to provide a review.

A computer associated with the customer, such as client 104, receives (608) the email message and displays the message 322 in GUI 108 using email application 320.

Figure 7B:
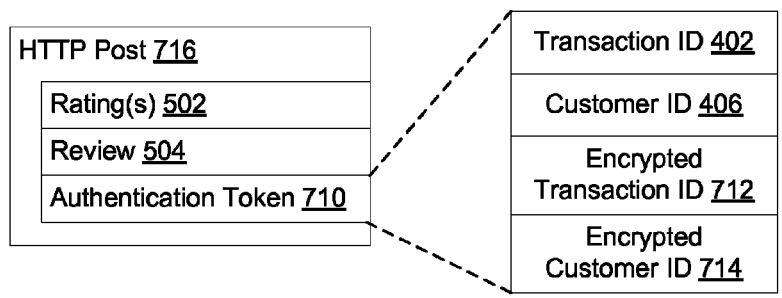
FIG. 7B is a block diagram of an HTTP form submission in accordance with one embodiment of the present invention.

In response to activation of the HTTP form submission command 708 (e.g., by the customer clicking on review submission icon 808), client 104 sends (610) an HTTP form submission 716 as the response to the request. FIG. 7B is a block diagram of an HTTP form submission 716 in accordance with one embodiment of the present invention. The response to the request may contain a rating 502 for the product (e.g., entered by the customer in rating input area 704) and/or text of a review 504 of the product (e.g., entered by the customer in text input area 706), and the authentication token 710.

Transaction server 102 receives (612) the response to the request and authenticates (614) the response using the authentication token 710. In some embodiments, the authentication is performed by decrypting the encrypted transaction ID 712 and comparing the decrypted result with transaction ID 402. If the decrypted result matches transaction ID 402, then the response is considered authenticated. In addition, authentication of the response may also require that the transaction database 220 (FIGS. 2 and 4) includes a transaction that matches both the transaction ID 402 and the customer ID 406 in the response. In some embodiments, for added security, authentication of the response includes decrypting the encrypted customer ID 712 and comparing it to customer ID 406. If any of these tests fail, authentication fails and the response is rejected. If all of the authentication tests are passed the processing of the response continues. In other embodiments, the authentication token 710 includes a digital signature, such as a digital signature of the transaction ID, and authentication of the response by the transaction server 102 includes checking the validity of the digital signature. In yet other embodiments, the authentication token 710 includes a unique token generated for each transaction. The unique token for each transaction is stored in the transaction database 220 (FIGS. 2, 4). The unique token may, for instance, be (or may include) a randomly or pseudorandomly generated value. In these embodiments, authentication of the response by the transaction server 102 includes checking that the response includes a token that matches the unique token stored in the transaction database.

Transaction server 102 stores (616) (e.g., in reviews database 224) at least part of the response (e.g., the rating 502 and/or the review 504) if no other responses corresponding to the transaction (e.g., no prior responses to the review request email) have been received. In some embodiments, product reviews are limited to a single review and/or rating per transaction in order to make aggregate product rating statistics more reliable and less susceptible to manipulation.

In some embodiments, email server 228 sends (618) a confirmation message to the customer, which may be received (620) by client 104.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, performed by server having one or more processors and memory storing programs to be executed by the server, the method comprising:
at the server:
sending an HTML email to a customer at a predetermined time,
wherein the HTML email contains
a request to review a product purchased by the customer and sent to the customer using a respective method of delivery,
a rating input area,
a text input area,
an authentication token, and
an HTTP form submission command to send a response to the request from the customer back to the server, and
receiving the response and authenticating the response using the authentication token,
wherein the response contains at least one of a rating that was entered in the rating input area and text that was entered in the text input area.

2. The computer-implemented method of claim 1, wherein the predetermined time is based at least in part on the respective delivery method.

3. The computer-implemented method of claim 1, wherein the authentication token includes an encrypted transaction identifier.

4. The computer-implemented method of claim 1, wherein the HTTP form submission command is selected from the group consisting of an HTTP post command, an HTTP get command, an HTTPS post command and an HTTPS get command.

5. The computer-implemented method of claim 1, wherein the request to review the product includes text that depends on a number of reviews previously received for the product from other customers.

6. The computer-implemented method of claim 1, wherein the request to review the product purchased by the customer is only sent to the customer once.

7. The computer-implemented method of claim 1, wherein the request to review the product purchased by the customer is not sent to the customer if the customer indicates that the customer does not want to receive a request to review the product purchased by the customer.

8. The computer-implemented method of claim 1, wherein sending the HTML email includes sending the HTML email in accordance with a determination that a request to review a product purchased by a customer was not previously sent to the customer, and that the customer did not indicate that the customer did not want to receive the request to review the product.

9. The computer-implemented method of claim 1, further comprising storing at least part of the response in accordance with a determination that no other responses corresponding to the purchase have been received.

10. A computer-implemented method, performed by a client computer associated with a customer, the client computer having one or more processors and memory storing programs to be executed by the client computer, the method comprising:
at the client computer:
receiving an electronic message, wherein the electronic message contains
a request to review a product obtained by a customer in a transaction,
a rating input area and/or a text input area,
an authentication token, and
an HTTP form submission command to send a response to the request from the customer to a remote computer;
sending, in response to activation of the HTTP form submission command, the response to the request to the remote computer, wherein the response to the request contains
a rating that was entered in the rating input area and/or text that was entered in the text input area, and further contains the authentication token to enable authentication of the response by the remote computer using the authentication token.

11. The computer-implemented method of claim 10, wherein the electronic message is an HTML email message.

12. A client computer associated with a customer, the client computer having one or more processors and memory storing programs to be executed by the client computer, wherein the client computer is configured to:
receive an electronic message, wherein the electronic message contains
a request to review a product obtained by a customer in a transaction,
a rating input area and/or a text input area,
an authentication token, and
an HTTP form submission command to send a response to the request from the customer to a remote computer; and
send, in response to activation of the HTTP form submission command, the response to the request to the remote computer, wherein the response to the request contains
a rating that was entered in the rating input area and/or text that was entered in the text input area, and further contains the authentication token to enable authentication of the response by the remote computer using the authentication token.

13. The client computer of claim 12, wherein the electronic message is an HTML email message.

14. A non-transitory machine readable medium having stored thereon data representing sequences of instructions, which when executed by a server, cause the server to:
send an email message to a customer at a predetermined time, wherein the email message contains:
a request to review a product purchased by the customer and sent to the customer using a respective method of delivery,
a rating input area and/or a text input area,
an authentication token, and
an HTTP form submission command to send a response to the request from the customer to the server;

receive the response, wherein the response contains
  a rating that was entered in the rating input area and/or text that was entered in the text input area, and
  the authentication token; and
authenticate the response using the authentication token.

15. The non-transitory machine readable medium of claim 14, wherein the predetermined time is based at least in part on the respective delivery method.

16. The non-transitory machine readable medium of claim 14, wherein the data representing sequences of instructions, when executed by a server, cause the server to store at least part of the response in accordance with a determination that no other responses corresponding to the transaction have been received.

17. The non-transitory machine readable medium of claim 14, wherein the email message is an HTML email message.

18. A non-transitory machine readable medium having stored thereon data representing sequences of instructions, which when executed by a client computer associated with a customer, cause the client computer to:
receive an electronic message, wherein the electronic message contains
a request to review a product obtained by a customer in a transaction,
a rating input area and/or a text input area,
an authentication token, and
an HTTP form submission command to send a response to the request from the customer to a remote computer; and
send, in response to activation of the HTTP form submission command, the response to the request to the remote computer, wherein the response to the request contains
a rating that was entered in the rating input area and/or text that was entered in the text input area, and further contains the authentication token to enable authentication of the response by the remote computer using the authentication token.

19. The non-transitory machine readable medium of claim 18, wherein the electronic message is an HTML email message.

20. A server system having one or more processors and memory storing programs to be executed by the server, wherein the server system is configured to:
send an email message to a customer at a predetermined time, wherein the email message contains:
  a request to review a product purchased by the customer and sent to the customer using a respective method of delivery,
  a rating input area and/or a text input area,
  an authentication token, and
  an HTTP form submission command to send a response to the request from the customer to the server system;
receiving the response, wherein the response contains
  a rating that was entered in the rating input area and/or text that was entered in the text input area, and
  the authentication token; and
authenticate the response using the authentication token.

21. The server system of claim 20, wherein the predetermined time is based at least in part on the respective delivery method.

22. The server system of claim 20, wherein the server system is further configured to store at least part of the response in accordance with a determination that no other responses corresponding to the transaction have been received.

23. The server system of claim 20, wherein the email message is an HTML email message.

\* \* \* \* \*